United States Patent
Margalit et al.

(10) Patent No.: US 8,665,434 B2
(45) Date of Patent: Mar. 4, 2014

(54) INTEGRATED RAMAN SPECTROSCOPY DETECTOR

(75) Inventors: Mordehai Margalit, Zichron Yaaqov (IL); Ariel Lipson, Tel Aviv (IL)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 13/640,360

(22) PCT Filed: Jun. 4, 2012

(86) PCT No.: PCT/US2012/040698
§ 371 (c)(1),
(2), (4) Date: Oct. 10, 2012

(87) PCT Pub. No.: WO2013/184088
PCT Pub. Date: Dec. 12, 2013

(65) Prior Publication Data
US 2013/0321800 A1    Dec. 5, 2013

(51) Int. Cl.
*G01J 3/44*        (2006.01)
(52) U.S. Cl.
USPC .......................................................... 356/301
(58) Field of Classification Search
USPC ............................................. 356/72–73, 301
See application file for complete search history.

(56) References Cited

U.S. PATENT DOCUMENTS

| | | | |
|---|---|---|---|
| 4,193,690 | A | 3/1980 | Levenson et al. |
| 7,586,603 | B2 | 9/2009 | Maity et al. |
| 2005/0105099 | A1 | 5/2005 | Shpantzer et al. |
| 2008/0285041 | A1 | 11/2008 | Ocelic et al. |
| 2008/0304074 | A1 | 12/2008 | Brennan, III |
| 2009/0021724 | A1 | 1/2009 | Mahadevan-Jansen et al. |
| 2010/0046039 | A1 | 2/2010 | Xie et al. |
| 2011/0063609 | A1 | 3/2011 | Ito et al. |
| 2012/0127464 | A1* | 5/2012 | Oigawa et al. ................ 356/301 |

OTHER PUBLICATIONS

Science News: From Lectures to Explosives Detection: Laser Pointer Identifies Dangerous Chemicals in Real-Time, *ScienceDaily* (Oct. 10, 2012), http://www.sciencedaily.com/releases/2012/10/121010112546.htm.
International Search Report and Written Opinion for PCT/US2012/040698 dated Aug. 22, 2012.
Chang et al., Optical Heterodyne Detection of Impulsive Stimulated Raman Scattering in Liquids, *J. Phys. Chem.* (1995), 99:7857-7859.
Chemical Analysis by RAMAN Spectroscopy, http://www.rigakuraman.com (Printed from Internet Sep. 16, 2012).

(Continued)

*Primary Examiner* — Tarifur Chowdhury
*Assistant Examiner* — Abdullahi Nur
(74) *Attorney, Agent, or Firm* — Pepper Hamilton LLP

(57) ABSTRACT

A system and method for performing Raman spectroscopy using a heterodyne detection scheme are described. The heterodyne detection scheme can combine a modulated portion of radiation having passed through a sample to be analyzed with a reference radiation to produce a combined frequency signal. At least a portion of the reference radiation can be filtered out of the combined frequency signal, resulting in a filtered frequency signal. Information related to the sample can be determined based upon the filtered signal. The determined information can then be analyzed to determine a chemical composition of the sample.

28 Claims, 3 Drawing Sheets

(56) References Cited

OTHER PUBLICATIONS

Optical Heterodyne Detection, http://en.wikipedia.org/wiki/Optical_heterodyne_detection (Printed from Internet Sep. 16, 2012).

Intelligent Tunable Laser Diode Source, http://www.ozoptics.com/ALLNEW_PDF/DTS0090.pdf, (Printed from Internet Sep. 16, 2012).

McOmber, Swept coherent heterodyne techniques provide high resolution, May 1, 2002 (http://www.laserfocusworld.com/articles/print/volume-38/issue-5/features/spectrometers/swept-coherent-heterodyne-techniques-provide-high-resolution.html).

Laser 2000: The Future of Photonics, http://www.laser2000.de/fileadmin/Produktdaten/RRT/datenblaetter_gestempelt/Rigaku%20Xantus-532.pdf (Printed from Internet Oct. 2, 2012).

\* cited by examiner

INTEGRATED RAMAN SPECTROSCOPY DETECTOR

CLAIM OF PRIORITY

This application is a U.S. national stage filing under 35U.S.C. §371of International Application No. PCT/US12/40698 filed Jun. 4, 2012 entitled "Integrated Raman Spectroscopy Sensor," the disclosure of which is incorporated by reference in its entirety.

BACKGROUND

Raman spectroscopy is a well-known method for investigating and determining a chemical composition of a sample, whether in solid, liquid or gaseous form. A fine laser, typically a single mode laser operating at a single wavelength, is directed at the sample. A scattered Raman signal is collected through an optical probe and analyzed in a high resolution spectrometer. The laser emits an input signal including photons at wavelength $\lambda_i$. The photons are scattered by the sample at a shifted wavelength $\lambda_o$ dependent on the chemical composition of the sample, where $\lambda_o > \lambda_i$. The shift is a result of molecule-dependent-photons that cause some of the input energy to be absorbed by the sample before scattering. The scattered photons are unique for every molecule and thus the collected spectrum is a unique representation of the chemical composition of the sample.

Only a small portion of the input signal causes the Raman effect (on the order of $10^{-9}$ of the total input signal), so detection must be greatly enhanced. This results in the need for a high resolution and low noise spectrometer for detection. Such spectrometers are typically large in size, costly to acquire and operate, and require cooling which results in additional power consumption and additional costs. Recently, some handheld spectrometers have emerged, providing a size reduction, but at the expense of reduced spectral resolution, thereby limiting their usefulness.

Conventional spectrometers need to highly disperse light in order to reach sufficient resolution and, thus, are limited in functionality when miniaturized or designed as smaller devices. In a typical Raman spectroscopy device, the spectrometer accounts for more than 75% of the cost and a similar percentage of the size and weight of the device.

SUMMARY

In one general respect, the embodiments disclose a system for performing Raman spectroscopy. The system includes at least one first radiation source configured to produce a first radiation at a first frequency and direct the first radiation at a sample to be analyzed, wherein at least a portion of the first radiation passes through and is modulated by the sample, thereby resulting in a modulated portion of the first radiation; at least one second radiation source configured to produce a reference radiation at a second frequency; receiving optics configured to collect the modulated portion of the first radiation; and at least one detection device configured to receive a combined frequency signal comprising the modulated portion of the first radiation and the reference radiation, the at least one detection device comprising at least one filter configured to filter at least a portion of the reference radiation from the combined frequency signal to produce a filtered frequency signal.

In another general respect, the embodiments disclose a method of performing Raman spectroscopy. The method includes providing a sample to be analyzed; directing first radiation from at least one first radiation source towards the sample, wherein at least a portion of the first radiation passes through and is modulated by the sample, thereby resulting in a modulated portion of the first radiation; collecting the modulated portion of the first radiation at one or more receiving optics; directing the reflected portion of the first radiation from the one or more receiving optics to at least one detection device; combining the modulated portion of the first radiation with a reference radiation from at least one second radiation source to produce a combined frequency signal; and filtering the combined frequency signal to remove at least a portion of the reference radiation at at least one filter to produce a filtered frequency signal.

In another general respect, the embodiments disclose a system for determining a chemical composition of a sample. The system includes at least one first laser configured to produce a first radiation having a first frequency and direct the first light at a sample to be analyzed, wherein at least a portion of the first radiation passes through and is modulated by the sample, thereby resulting in a modulated portion of the first radiation; at least one second laser configured to produce a reference radiation having a second frequency; receiving optics configured to collect the modulated portion of the first radiation; a detection device configured to receive a combined frequency signal comprising the modulated portion of the first radiation and the reference radiation; and an analysis device operably connected to the at least one sensor. The detection device includes at least one filter configured to filter at least a portion of the reference radiation from the combined frequency signal to produce a filtered frequency signal and at least one sensor configured to determine information related to the sample based upon the filtered frequency signal. The analysis device is configured to determine a chemical composition of the sample based upon the determined information.

In another general respect, the embodiments disclose a method of determining a chemical composition of a sample. The method includes providing a sample to be analyzed; directing first radiation from at least one first laser towards the sample, wherein at least a portion of the first radiation passes through and is modulated by the sample, thereby resulting in a modulated portion of the first radiation; collecting the modulated portion of the first radiation at one or more receiving optics; directing the modulated portion of the first radiation from the one or more receiving optics to a detection device; combining the modulated portion of the first radiation with a reference radiation from at least one second radiation source to produce a combined frequency signal; filtering the combined frequency signal to remove at least a portion of the reference radiation at at least one filter to produce a filtered frequency signal; determining information related to the sample based upon the filtered frequency signal at at least one sensor; and determining a chemical composition of the sample based upon the determined information at an analysis device.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Raman spectroscopy provides information about molecular vibrations that can be used for sample identification and quantitation. The technique involves shining a monochromatic light source (i.e. laser) on a sample and detecting the scattered light. The majority of the scattered light is of the same frequency as the excitation source; this is known as Rayleigh or elastic scattering. A small amount of the scattered light (ca. 10-5% of the incident light intensity) is shifted in energy from the laser frequency due to interactions between the incident electromagnetic waves and the vibrational energy levels of the molecules in the sample. Plotting the intensity of this "shifted" light versus frequency results in a Raman spectrum of the sample. Generally, Raman spectra are plotted with respect to the laser frequency such that the Rayleigh band lies at 0 cm−1. On this scale, the band positions will lie at frequencies that correspond to the energy levels of different functional group vibrations. The Raman spectrum can thus be interpreted similar to the infrared absorption spectrum.

As used herein, "Raman spectrum" or a "Raman spectra" refers to an a radiation frequency range of approximately 100 $cm^{-1}$ to 5000 $cm^{-1}$, as shifted from a frequency of a radiation source. The unit $cm^{-1}$ represents a shift in wavelength of a resulting signal that has passed through a sample being analyzed as compared to the input signal initially directed at the sample. A range of Raman spectra shift $\Delta\omega$ may be determined using the following conversion:

$$\Delta\omega(cm^{-1}) = \left(\frac{1}{\lambda_0(nm)} - \frac{1}{\lambda_1(nm)}\right) \times 10^7$$

This conversion effectively multiplies the wavelength range by (nm)/(cm).

The present disclosure relates to an integrated solution for addressing the existing problems in Raman spectroscopy based on a heterodyne detection scheme of Raman spectra. The scheme is based on directing radiation, such as laser light, at a sample to be analyzed and collecting the Raman signal in a standard manner. However, instead of using a spectrometer to disperse the Raman signal such that the Raman spectra can be viewed, the heterodyne detection scheme uses a tunable laser that is combined with the Raman signal. Both optical signals impinge on an optical sensor. The resulting electrical signal as produced by the optical sensor has a heterodyne component whose frequency depends on the frequency difference between the tunable laser and the Raman spectra. By using an electrical filter, a desired signal is isolated and a high resolution optical filter is obtained.

Figure 1:
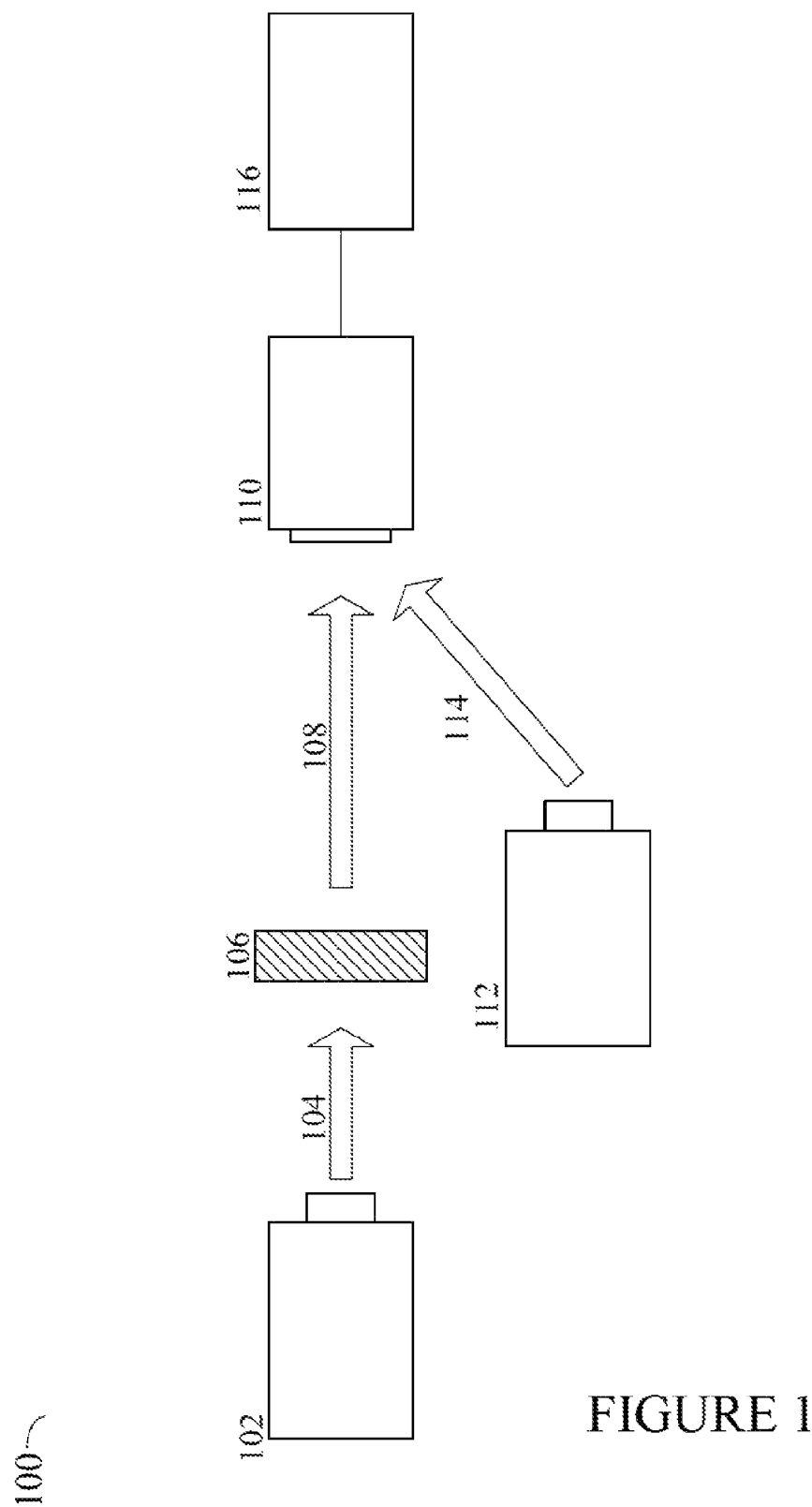
FIG. 1 shows an illustrative system for performing Raman spectroscopy.

FIG. 1 shows an illustrative system 100 for performing Raman spectroscopy. A first radiation source 102 may be configured to produce a first radiation 104 at a first frequency, e.g., $f_5$. The first radiation source 102 may be positioned and configured to direct the first radiation 104 at a sample 106 to be analyzed. As the first radiation passes through the sample, at least a portion of the first radiation may be modulated, resulting in modulated radiation 108. The modulated radiation 108 may be received by receiving optics such as an optical sensor 110.

The system 100 may also include a second radiation source 112. The second radiation source may be configured to produce a reference or second radiation 114 and direct the second radiation at the optical sensor 110.

In an example, the first radiation source 102 may be a dynamically tunable laser designed to produce laser light at frequency $f_8$. In an embodiment, the first radiation source 102 may be a dynamically tunable laser configured to produce frequency $f_8$ within the Raman spectra of the sample 106 to be analyzed, e.g., within a range of approximately 100 $cm^{-1}$ to 5000 $cm^{-1}$ as shifted from the frequency of the tunable laser.

Similarly, the second radiation source 112 may be a scanning or dynamically tunable laser configured to scan a range of frequencies to produce the reference radiation as laser light that is in the region of the Raman spectra of the sample 106 to be analyzed. In an embodiment, the second radiation source 110 may be a dynamically tunable laser configured to produce the reference signal at a frequency within the Raman spectra of the sample 106 to be analyzed. e.g., within a range of approximately 100 $cm^{-1}$ to 5000 $cm^{-1}$ as shifted from the frequency of the tunable laser.

The modulated light that has passed through the sample, i.e., the Raman signal, and the reference light both impinge the optical sensor. In heterodyne detection, a signal of interest at a particular frequency is non-linearly mixed with a reference signal that is set at a close-by frequency. In the example above, the reference signal (i.e. second radiation 114) is within the Raman spectra of the sample 106 to be analyzed. The resulting signal of the non-linear mixing is a signal which carries information such as amplitude, phase and frequency of the original, higher frequency signal, but is oscillating at the frequency difference. To separate a desired frequency of interest, an electrical or radio frequency (RF) filter such as a direct current electrical filter may be applied to the resulting signal. The amplitude of the signal, which is linearly proportional to the amplitude of the Raman signal at a desired frequency, may be obtained from a standard amplitude detector.

To perform the heterodyne detection, the optical sensor 110 may include various filters and electronics such as a non-linear mixer for combining the Raman signal 108 and the reference signal 114 to produce a combined signal. The optical sensor 110 may further include a filter such as a direct current electrical filter to filter out at least a portion of the reference signal from the combined signal, thereby producing a filtered signal for further analysis. The optical sensor 110 may be operably connected to an analysis device 116 such as a computer or similar processing device configured to receive the filtered signal and determine a chemical composition of the sample 106 based upon various properties of the filtered signal. An illustrative process for analyzing and determining the chemical composition of the sample 106 based upon various properties of the filtered signal is discussed in additional detail below in reference to FIG. 2.

Figure 2:
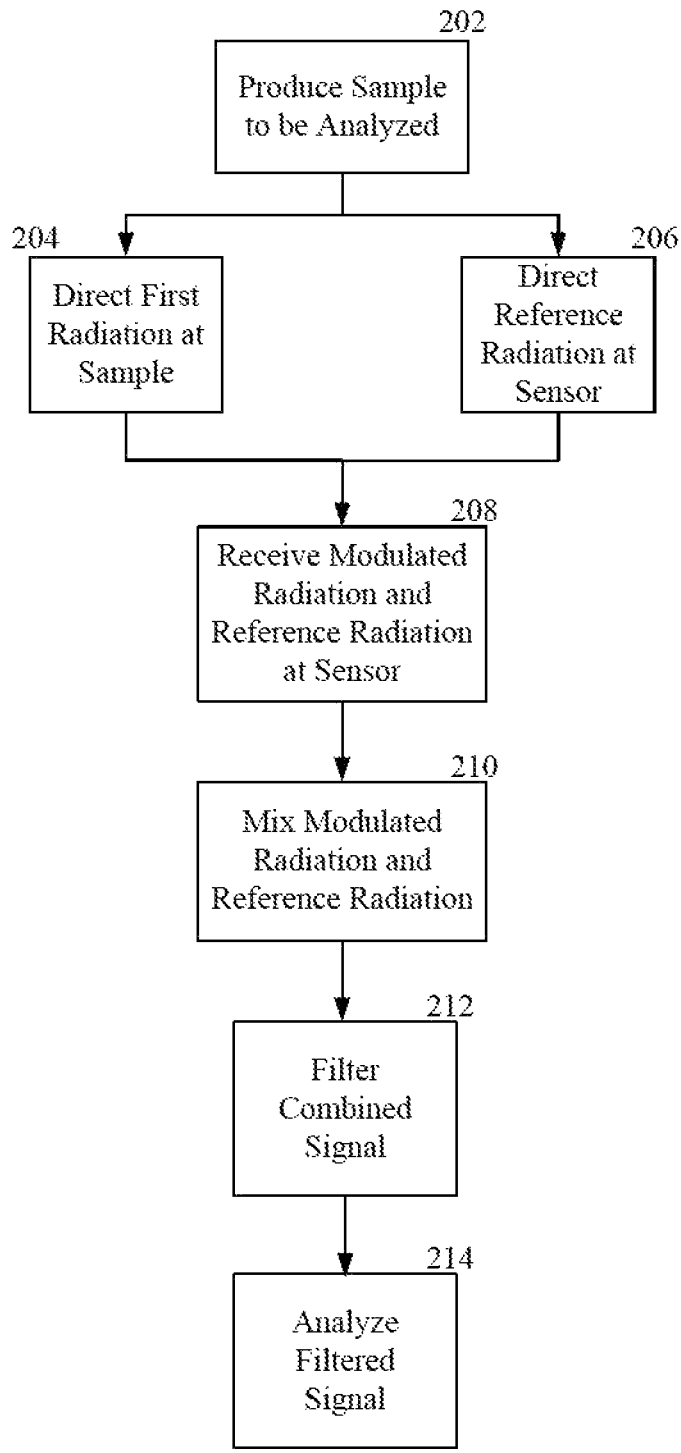
FIG. 2 shows an illustrative process for performing Raman spectroscopy.

FIG. 2 shows an illustrative process for performing Raman spectroscopy using a system such as system 100 as shown in FIG. 1. The following discussion of FIG. 2 illustrates an exemplary set of equations that may be used in the heterodyne detection scheme as discussed above. It should be noted the following equations and discussion is for illustrative purposes only, and additional equations may be used to implement the heterodyne detection scheme.

A sample may be provided 202 for analysis. For example, a sample of drinking water may be provided 202 for an analysis of any potential contaminants contained therein. A first radiation source, such as a dynamically tunable laser, may direct 204 radiation at the sample. As the radiation passes through the sample, at least a portion of the radiation may be modulated by vibrating molecules within the sample, thereby producing a modulated or Raman radiation signal. At or about the same time, a second radiation source such as a scanning laser may direct 206 a reference radiation signal at a sensor.

The sensor may receive 208 both the modulated radiation signal and the reference radiation signal. The two signals may be mixed 210, e.g., via a non-linear mixer, into a combined signal. Equation 1 shows an exemplary combined signal S(t):

$$S(t)=S_R(t)e^{-i2\pi f_R t}+S_T(t)e^{-i2\pi f_T t} \quad \text{EQUATION 1:}$$

Where: $S_R(t)$ is the Raman spectra amplitude at frequency $f_R$
$S_T(t)$ is the reference radiation signal at frequency $f_T$ The combined signal may be filtered 212 according to various methods depending on the configuration of the optical sensor and analyzing electronics. For example, to filter 210 high frequency components from the combined signal to produce a normalized detector signal D(t), the combined signal may be squared as shown in Equation 2:

$$D(t)=S(t)^2=S_R(t)S_T(t)\sin(2\pi(f_R-f_T)) \quad \text{EQUATION 2:}$$

As a typical Raman signal is composed of multiple concurrent frequencies, the detector signal D(t) has the same Raman spectra as the modulated Raman signal. For example, known frequencies $f_1$ and $f_2$ may be substituted into Equation 2, resulting in the following equation 3:

$$D(t)=S_1(t)S_T(t)\sin(2\pi(f_1-f_T))+S_2(t)S_T(t)\sin(2\pi(f_2-f_T)) \quad \text{EQUATION 3:}$$

The separation of $f_1$ and $f_2$ may be achieved by further filtering 212 the signal with an electrical filter. Since very high resolution filters are easily created in the electrical domain, it is possible to replace the spectrometer of the prior art with a heterodyne detection scheme using the process and similar equations as those discussed above.

After filtering 212, the signal may be analyzed 214 at a computer or other similar processing device to determine the chemical composition of the provided 202 sample. By analyzing 214 the amplitude of individual peaks contained in the resulting filtered signal, one or more potential contaminants in the drinking water may be identified.

In the above example, once an electrical filter is chosen, the scanning of the Raman spectra may be attained by tuning the scanning laser (i.e., the second radiation source) by changing the frequency $f_T$ of the scanning laser over the frequency of interest. If the electrical filters are solely designed as direct current filters, the detection scheme may be referred to as homodyne. However, a homodyne detection scheme may have several potential hindrances. For example, noise that exists in all electronics and photodetectors is more predominant at lower frequencies. Moreover, it is more challenging to design a tight electric filter around direct current than for alternating current.

One potential hindrance to a heterodyne detection scheme as described above may be that the modulated signal may be composed of two or more Raman signals. Because the scheme works on frequency differences, both a signal below and a signal above the scanning laser signal may appear after the filters. One solution to this may be to scan the Raman spectra where an initial scan has only positive (or negative) Raman components. Then, a double signal may be convoluted by subtracting the earlier scanned signals.

Figure 3:
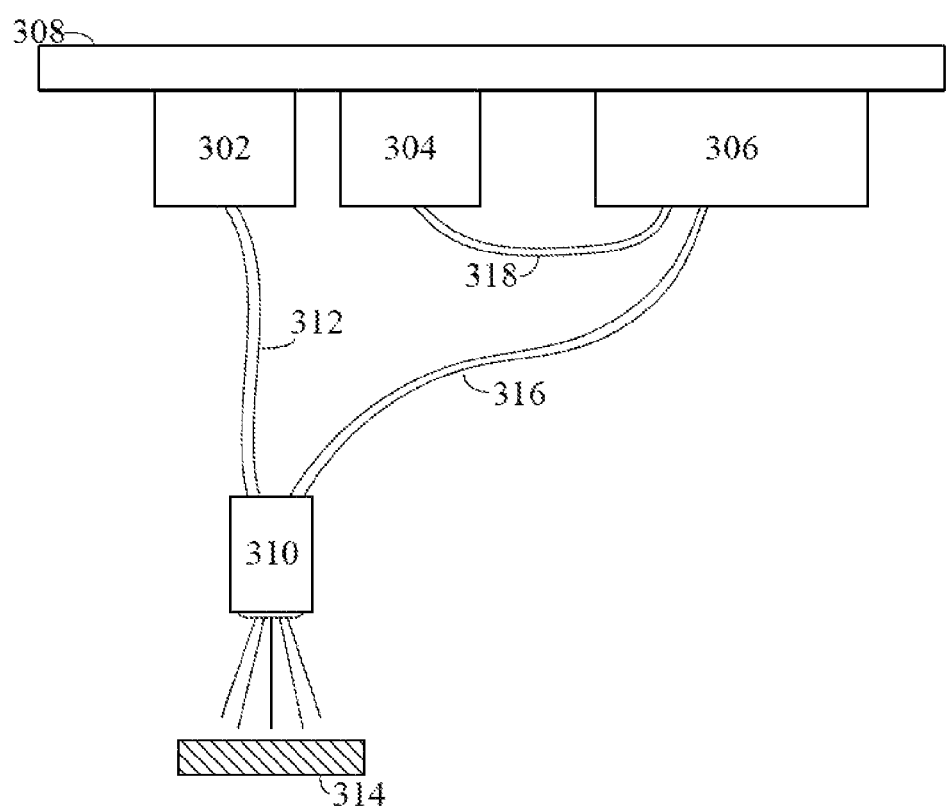
FIG. 3 shows an alternative system for performing Raman spectroscopy.

A system 300 as shown in FIG. 3 depicts an illustrative set of components that may be incorporated into a Raman spectroscopy system. FIG. 3 shows a system 300 including a specific set of components that may be used to reduce the overall size and cost of a system for performing Raman spectroscopy, for example, for incorporation into a handheld device. The system may include a first radiation source 302, a second radiation source 304 and various electronics 306 for performing the heterodyne detection scheme, including a non-linear mixer and one or more filters. In this example, each of the first radiation source 302 and the second radiation source 304 may be tunable laser diodes having similar operational characteristics. For example, the first radiation source 302 may be a single mode laser diode having a wavelength of 532 nm. The second radiation source 304 may be a single mode laser diode having a wavelength of 558 nm with a +/−2 nm scan. As each of the laser diodes are similar in operational characteristics, both the first radiation source 302 and the second radiation source 304 may be mounted on the same substrate 308, such as a printed circuit board. Additionally, any need for temperature compensation is reduced or eliminated as both the first radiation source 302 and the second radiation source 304 may thermally drift at similar rates. To conserve space and cost, the various electronics 306 may also be mounted on the substrate 308.

The first radiation source may be optically connected to a focusing device 310 via one or more optic fibers 312. The focusing device 310 may be configured to direct radiation produced by the first radiation source 302, received via optic fiber 312, at a sample 314 to be analyzed. A portion of modulated radiation may be reflected by the sample 314 at the focusing device 310, received by the focusing device and transferred optically to the various electronics 306 via one or more optic fibers 316. Similarly, the second radiation source 304 may produce a reference signal and transfer the reference signal to the various electronics 306 via one or more optic fibers 318. By using optic fibers, a non-linear pathway may be created in which the radiation can travel, thereby resulting in a non-linear arrangement of the various components of system 300 and a smaller overall size when implemented into a single package such as a handheld device. A handheld device incorporating a system for Raman spectroscopy, such as system 300, may further include a processing device for analyzing a resulting filtered signal as produced by the various electronics 306, an input for receiving configuration information from a user of the device, a display for presenting results information to the user, a memory for storing results information related to the sample being analyzed, an output for operably connecting the handheld device to an external computing device, and other similar features common to a handheld testing device.

It should be noted that the embodiments as shown in the figures are shown by way of example only. Additional changes and/or improvements to the embodiments discussed herein may be made. For example, the process steps and equations discussed above in reference to FIG. 2 are shown by way of example only. Additionally, the arrangement of components as shown in FIG. 3 is for illustrative purposes only. Alternative arrangements and components may be incorporated depending on the intended application of the system. For example, the various electronics 306 for performing the heterodyne detection scheme may be replaced with a field programmable gate array (FPGA) configured to perform the collective functions of the various electronics, such as the non-linear mixer and the one or more filters.

EXAMPLE 1

Handheld Device

As shown in FIG. 3, the various components for performing Raman spectroscopy using a heterodyne detection scheme may produce a system reduced in size that can be incorporated into a handheld device for portable use. Similar to the system 300 as shown in FIG. 3, the handheld device may include a printed circuit board including two or more tunable laser diodes, at least one laser diode optically connected to a lens or other similar focusing device and configured to direct radiation through the optic fiber to the lens, which focuses the radiation toward a sample to be analyzed, and at least one laser diode configured to scan a range to produce a reference signal. The printed circuit board may also include an optical sensor optically connected to the scanning laser diode and the lens via optic fibers, a processor including a memory having instructions for performing chemical analysis of a sample, and a display for outputting information related to the chemical analysis of a sample. The handheld device may further include a user input interface, providing the user with the ability to enter information related to the sample to be analyzed.

A government agency such as a national parks department may use such a portable device to test pollution levels at various areas of a national park. For example, a large river may pass through the national park. A park ranger or other similar employee of the parks department may travel the length of the river as it passes through the park, testing the water at various points along the length for contaminants with a portable Raman spectroscopy detector. The information may be used to determine if unwanted pollutants are passing through the river, potentially harming fish or wildlife.

Similarly, a homeowner who obtains their drinking water from a well or other natural resource may use a portable, handheld Raman spectroscopy detector to determine if their drinking water supply has any unwanted contaminants, and whether they need to filter or otherwise treat their drinking water supply.

It should be noted these two scenarios are shown by way of example only to illustrate potential uses for a handheld Raman spectroscopy device.

EXAMPLE 2

Medication Production

In a typical medication production facility, maintaining a clean work environment and preventing any unwanted materials from entering the production process are of great concern. The presently disclosed Raman spectroscopy system is a cheaper, smaller alternative to traditional Raman spectroscopy systems. As such, multiple Raman spectroscopy devices may be placed at various positions along a production line to ensure that no unwanted materials are present in the medication during production. A set of tunable lasers, including a first tunable laser and a second scanning laser, may be positioned along the assembly line, and directed such that a laser light is directed into the medication ingredients or mixtures as they pass the lasers. A modulated signal produced by the laser light reacting with the medication ingredients may be locally collected at each set of lasers, combined with a reference signal produced by the scanning laser at a local non-liner mixer, and transmitted as an electrical signal to a central location for further analysis. A central processor may receive the signals from multiple devices along the production line, determine the chemical composition at the various positions along the assembly line, and report any abnormalities or unexpected results to an operator at the central locations.

For example, prior to each ingredient being added to a specific medication, a Raman sample may be taken of the medication as it passes down the production line to verify that the composition of the medication is limited to desired ingredients. A similar process may be performed after each ingredient is added to ensure that only desired materials were added. Similarly, as a supply of one or more ingredients are received or added to the production line, the chemical composition of the ingredients may be confirmed to ensure that no unwanted materials enter the production line.

On a smaller scale, and incorporating principles of the above-discussed Example 1, individual pharmacists may have a handheld Raman spectroscopy device to verify that any medication received from a vendor is authentic and does not contain any unwanted materials. This may also act as to prevent counterfeit drugs that are not chemically the same as their authentic counterparts from being accidentally sold to customers.

EXAMPLE 3

Gasoline Refining

When refining gasoline, it is desirable to accurately determine an amount of ethanol contained in the gasoline. A Raman spectroscopy device such as that shown in FIG. 3 may be integrated along the refining process to monitor the ethanol level in the gasoline as it is refined. For example, for a specific refining process, ethanol may produce a peak at 880 cm$^{-1}$ on the Raman spectrum of the gasoline. The input laser directing radiation into the gasoline has a wavelength of 532 nm. Using the conversion as defined above, a wavelength shift of 880 cm$^{-1}$ results in a shift of 26 nm, i.e., 558 nm. In order to separate a peak at 880 cm$^{-1}$ from a neighbor peak (e.g., 920 cm$^{-1}$), the detector has a resolution of at least 0.1 nm and a scanning range of approximately 1.5 nm (920 cm$^{-1}$-880 cm$^{-1}$ as converted to nm). Higher resolutions may be used to separate closer materials, e.g., a resolution of 0.01 nm.

EXAMPLE 4

Cancer Detection

A Raman spectroscopy device such as that shown in FIG. 3 may be configured to measure and analyze fluorescence of blood serum from healthy and cancerous tissues. Based upon the results of this measurement and analysis, tissue from a new patient may be analyzed using a Raman spectroscopy device and a determination made as to whether the patient has cancerous tissue. For example, an argon-ion laser sweeping from 488 nm to 514.5 nm may be directed at a blood serum sample. In the non-cancerous tissue samples originally analyzed, three Raman peaks are consistently observed due to a higher level of carotene in the healthy blood serum. In the cancerous tissue, no peak of only slight Raman peaks were detected, resulting from the low levels of carotene. As such, a new patient's blood serum may be analyzed to determine carotene levels and whether the tissue from which the blood serum was extracted is cancerous.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to." etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together. B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together. A and C together. B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A system for performing Raman spectroscopy, the system comprising:
    at least one first radiation source configured to produce a first radiation at a first frequency and direct the first radiation at a sample to be analyzed, wherein at least a portion of the first radiation passes through and is modulated by the sample, thereby resulting in a modulated portion of the first radiation;
    at least one second radiation source configured to produce a reference radiation at a second frequency, wherein the reference radiation does not pass through the sample;
    receiving optics configured to collect the modulated portion of the first radiation; and
    at least one detection device configured to receive a combined frequency signal comprising the modulated portion of the first radiation and the reference radiation, the at least one detection device comprising at least one filter configured to filter at least a portion of the reference radiation from the combined frequency signal to produce a filtered frequency signal.

2. The system of claim 1, further comprising an analysis device configured to determine a chemical composition of the sample based upon the filtered frequency signal.

3. The system of claim 1, wherein the at least one first radiation source is a dynamically tunable radiation source having a tunable resolution such that the at least one first radiation source is configured to scan a dynamic range of frequencies.

4. The system of claim 1, wherein the at least one first radiation source is a tunable laser configured such that the first frequency is within a Raman spectra, wherein a frequency of the Raman spectra is within a range of 100 to 5000 cm$^{-1}$ as shifted from a frequency of the tunable laser.

5. The system of claim 4, wherein the at least one second radiation source is a tunable laser configured such that the reference radiation is within 5000 cm$^{-1}$ of a frequency of the first radiation.

6. The system of claim 4, wherein the at least one second radiation source is a scanning laser configured such that a frequency of the reference radiation is within 5000 cm$^{-1}$ of a frequency of the first radiation.

7. The system of claim 1, wherein the at least one first radiation source is a tunable laser diode and the at least one second radiation source is a tunable laser diode.

8. A method of performing Raman spectroscopy, the method comprising:
providing a sample to be analyzed;
directing first radiation from at least one first radiation source towards the sample, wherein at least a portion of the first radiation passes through and is modulated by the sample, thereby resulting in a modulated portion of the first radiation;
collecting the modulated portion of the first radiation at one or more receiving optics;
directing the modulated portion of the first radiation from the one or more receiving optics to at least one detection device;
combining the modulated portion of the first radiation with a reference radiation from at least one second radiation source to produce a combined frequency signal, wherein the reference radiation does not pass through the sample; and
filtering the combined frequency signal to remove at least a portion of the reference radiation at at least one filter to produce a filtered frequency signal.

9. The method of claim 8, further comprising determining a chemical composition of the sample based upon the filtered frequency signal at an analysis device.

10. The method of claim 8, wherein the at least one first radiation source is a dynamically tunable radiation source having a tunable resolution such that the at least one first radiation source is configured to scan a dynamic range of frequencies.

11. The method of claim 8, wherein the at least one first radiation source is a tunable laser configured such that the first radiation is within a Raman spectra, wherein a frequency of the Raman spectra is within a range of 100 to 5000 cm$^{-1}$ as shifted from a frequency of the tunable laser.

12. The method of claim 11, wherein the at least one second radiation source is a tunable laser configured such that a frequency of the reference radiation is within 5000 cm$^{-1}$ of a frequency of the first radiation.

13. The method of claim 11, wherein the at least one second radiation source is a scanning laser configured such that a frequency of the reference radiation is within 5000 cm$^{-1}$ of a frequency of the first radiation.

14. The method of claim 8, wherein the at least one first radiation source is a tunable laser diode and the at least one second radiation source is a tunable laser diode.

15. A system for determining a chemical composition of a sample, the system comprising:
at least one first laser configured to produce a first radiation having a first frequency and direct the first light at a sample to be analyzed, wherein at least a portion of the first radiation passes through and is modulated by the sample, thereby resulting in a modulated portion of the first radiation;
at least one second laser configured to produce a reference radiation having a second frequency, wherein the reference radiation does not pass through the sample;
receiving optics configured to collect the modulated portion of the first radiation;
a detection device configured to receive a combined frequency signal comprising the modulated portion of the first radiation and the reference radiation, the detection device comprising:
at least one filter configured to filter at least a portion of the reference radiation from the combined frequency signal to produce a filtered frequency signal, and
at least one sensor configured to determine information related to the sample based upon the filtered frequency signal; and
an analysis device operably connected to the at least one sensor and configured to determine a chemical composition of the sample based upon the determined information.

16. The system of claim 15, wherein the determined information comprises amplitude, phase, frequency or a combination thereof.

17. The system of claim 15, wherein the at least one first laser is a dynamically tunable laser having a tunable resolution such that the at least one first laser is configured to scan a dynamic range of frequencies.

18. The system of claim 15, wherein the at least one first laser is a tunable laser configured such that the first frequency is within a Raman spectra, wherein a frequency of the Raman spectra is within a range of 100 cm$^{-1}$ to 5000 cm$^{-1}$ as shifted from a frequency of the tunable laser.

19. The system of claim 18, wherein the at least one second laser is a tunable laser configured such that a frequency of the reference radiation is within 5000 cm$^{-1}$ of a frequency of the first radiation.

20. The system of claim 18, wherein the at least one second laser is a scanning laser configured such that a frequency of the reference radiation is within 5000 cm$^{-1}$ of a frequency of the first radiation.

21. The system of claim 15, wherein the at least one first laser is a tunable laser diode and the at least one second laser is a tunable laser diode.

22. A method of determining a chemical composition of a sample, the method comprising:
providing a sample to be analyzed;
directing first radiation from at least one first laser towards the sample, wherein at least a portion of the first radiation passes through and is modulated by the sample, thereby resulting in a modulated portion of the first radiation;
collecting the modulated portion of the first radiation at one or more receiving optics;
directing the modulated portion of the first radiation from the one or more receiving optics to a detection device;
combining the modulated portion of the first radiation with a reference radiation from at least one second radiation source to produce a combined frequency signal, wherein the reference radiation does not pass through the sample;
filtering the combined frequency signal to remove at least a portion of the reference radiation at at least one filter to produce a filtered frequency signal;

determining information related to the sample based upon the filtered frequency signal at at least one sensor; and determining a chemical composition of the sample based upon the determined information at an analysis device.

23. The method of claim 22, wherein the determined information comprises amplitude, phase, frequency or a combination thereof.

24. The method of claim 22, wherein the at least one first laser is a dynamically tunable laser having a tunable resolution such that the at least one first laser is configured to scan a dynamic range of frequencies.

25. The method of claim 22, wherein the at least one first laser is a tunable laser configured such that the first radiation is within a Raman spectra, wherein a frequency of the Raman spectra is within a range of 100 to 5000 $cm^{-1}$ as shifted from a frequency of the tunable laser.

26. The method of claim 25, wherein the at least one second laser is a tunable laser configured such that a frequency of the reference radiation is within 5000 $cm^{-1}$ of a frequency of the first radiation.

27. The method of claim 25, wherein the at least one second laser is a scanning laser configured such that a frequency of the reference radiation is within 5000 $cm^{-1}$ of a frequency of the first radiation.

28. The method of claim 22, wherein the at least one first laser is a tunable laser diode and the at least one second laser is a tunable laser diode.

* * * * *

UNITED STATES PATENT AND TRADEMARK OFFICE
CERTIFICATE OF CORRECTION

| | |
|---|---|
| PATENT NO. | : 8,665,434 B2 |
| APPLICATION NO. | : 13/640360 |
| DATED | : March 4, 2014 |
| INVENTOR(S) | : Margalit et al. |

It is certified that error appears in the above-identified patent and that said Letters Patent is hereby corrected as shown below:

In the Specification

In Column 3, Line 29, delete "an a radiation" and insert -- a radiation --, therefor.

In Column 4, Lines 16-17, delete "source 110" and insert -- source 112 --, therefor.

In Column 4, Line 19, delete "analyzed." and insert -- analyzed, --, therefor.

In Column 9, Line 23, delete "the singular" and insert -- the plural to the singular and/or from the singular --, therefor.

In Column 9, Line 32, delete "to.""" and insert -- to," --, therefor.

In Column 9, Line 61, delete "together. B" and insert -- together, B --, therefor.

In Column 10, Line 1, delete "together. A and C together. B" and insert -- together, A and C together, B --, therefor.

In the Claims

In Column 11, Line 7, in Claim 4, delete "100 to" and insert -- 100 $cm^{-1}$ to --, therefor.

In Column 11, Line 53, in Claim 11, delete "100 to" and insert -- 100 $cm^{-1}$ to --, therefor.

In Column 13, Line 15, in Claim 25, delete "100 to" and insert -- 100 $cm^{-1}$ to --, therefor.

Signed and Sealed this
First Day of July, 2014

Michelle K. Lee
*Deputy Director of the United States Patent and Trademark Office*